US006827409B2

(12) United States Patent
Michael

(10) Patent No.: US 6,827,409 B2
(45) Date of Patent: Dec. 7, 2004

(54) FLIP DOWN MONITOR WITH RETRACTABLE KEYBOARD TRAY

(76) Inventor: Gregory Michael, 2862 Scenic Meadow St., Waldorf, MD (US) 20603

( * ) Notice: Subject to any disclaimer, the term of this patent is extended or adjusted under 35 U.S.C. 154(b) by 0 days.

(21) Appl. No.: 10/401,729

(22) Filed: Mar. 31, 2003

(65) Prior Publication Data

US 2003/0197451 A1 Oct. 23, 2003

Related U.S. Application Data

(60) Provisional application No. 60/372,791, filed on Apr. 17, 2002.

(51) Int. Cl.⁷ .............................................. A47B 81/00
(52) U.S. Cl. ..................... 312/223.3; 312/196; 248/920
(58) Field of Search ............................. 312/223.3, 194, 312/196, 208.1, 208.3; 248/920, 917; 108/50.01; 361/680, 681, 682, 683

(56) References Cited

U.S. PATENT DOCUMENTS

| | | | |
|---|---|---|---|
| 4,735,467 A | | 4/1988 | Wolters |
| 4,769,764 A | * | 9/1988 | Levanon ..................... 361/680 |
| 5,033,804 A | * | 7/1991 | Faris ........................ 312/223.3 |
| 5,213,401 A | * | 5/1993 | Hatcher ..................... 312/208.1 |
| 5,232,277 A | * | 8/1993 | Cassady et al. ............. 312/296 |
| 5,364,177 A | | 11/1994 | Ugalde |
| 5,452,950 A | * | 9/1995 | Crenshaw et al. ....... 312/223.3 |
| 5,626,323 A | * | 5/1997 | Lechman et al. ........ 248/286.1 |
| 5,699,225 A | * | 12/1997 | Yavitz et al. ................ 361/683 |
| 5,729,429 A | * | 3/1998 | Margaritis et al. .......... 361/680 |
| 5,872,606 A | * | 2/1999 | Kim ............................ 349/58 |
| 6,059,385 A | | 5/2000 | Guhl |
| 6,082,838 A | * | 7/2000 | Bissu-Palombo ........... 312/195 |
| 6,092,883 A | * | 7/2000 | Lechman ..................... 312/194 |
| 6,237,507 B1 | * | 5/2001 | Yanagisawa et al. .......... 108/3 |
| 6,262,885 B1 | * | 7/2001 | Emma et al. ................ 361/683 |
| 6,464,195 B1 | * | 10/2002 | Hildebrandt ................. 248/460 |
| 6,508,526 B2 | * | 1/2003 | Reppas et al. .............. 312/237 |
| 6,553,919 B1 | * | 4/2003 | Nevin ...................... 108/50.01 |
| 6,589,308 B1 | * | 7/2003 | Gianelo ..................... 55/385.6 |
| 6,601,931 B1 | * | 8/2003 | Schairbaum et al. ........ 312/194 |
| 6,665,175 B1 | * | 12/2003 | deBoer et al. .............. 361/681 |
| 2003/0110989 A1 | * | 6/2003 | Chuang ................... 108/50.01 |

FOREIGN PATENT DOCUMENTS

JP        05108203 A   *  4/1993   ............. G06F/1/16

* cited by examiner

Primary Examiner—Peter M. Cuomo
Assistant Examiner—Stephen D'Adamo
(74) Attorney, Agent, or Firm—Richard C. Litman

(57) ABSTRACT

The present invention is an integrated sliding keyboard tray and adjustable flip down monitor. It has a bracket that is mounted to a slot cut into an existing work surface. A flat panel monitor and a keyboard tray are both slidably mounted to separate pairs of rails disposed upon the bracket. The monitor may be adjusted forward, back, up, down and for pitch. When not in use the monitor may be folded down parallel to the existing work surface against which it forms a watertight seal.

18 Claims, 5 Drawing Sheets

FLIP DOWN MONITOR WITH RETRACTABLE KEYBOARD TRAY

CROSS REFERENCE TO RELATED APPLICATION

This application claims the benefit of U.S. Provisional Patent Application Ser. No. 60/372,791, filed Apr. 17, 2002.

BACKGROUND OF THE INVENTION

1. Field of the Invention

The present invention relates to computer workstation devices, more specifically, to a flip down monitor and a retractable keyboard tray mounted to a common bracket. The bracket is inserted into a desktop in such a manner that the monitor can flip up and the keyboard can slide out for use as a computer workstation, or the keyboard can slide into the bracket and the monitor can be flipped down to form part of a desktop work surface.

2. Description of the Related Art

The use of computers has vastly increased over the past few decades to the point where computers are an integral part of almost every workplace. Unfortunately the presence of a computer monitor and keyboard in a computer workstation, especially in smaller workstations, occupies space on the desktop and thereby can contract the space available for or even preclude the use of the desktop work space for many non-computer activities. For example workstations in computer training rooms cannot be used to comfortably take notes during a lecture because the majority of the useable desktop space is taken up with computer equipment.

Many inventors have tried to solve the above-mentioned problem but have not done so in the manner described in the present invention. For example, U.S. Pat. No. 4,735,467 to Wolters describes a stowaway video display terminal in combination with a computer workstation or desk wherein the video display terminal is concealed within the desk beneath the work surface in a stored condition when not in use. The '467 patent is distinguishable because it does not have a sliding keyboard tray, nor does it have a folding monitor with an incorporated writing surface.

U.S. Pat. No. 5,364,177 to Ugalde describes a convertible computer workstation having a desk with a horizontal work surface and a monitor cabinet. The cabinet can shift to reveal a monitor, and a keyboard can slide out from under the work surface. This invention is distinguishable from the present invention in that the cabinet used to hide or expose the monitor cannot be used to adjust the viewing angle or height of the monitor, and the cabinet does not make a water tight seal with the work surface thereby subjecting the interior of the desk and the monitor to beverage spills.

U.S. Pat. No. 6,059,385 to Guhl discloses a computer module for use in combination with a desk wherein the computer is concealed within the desk to provide free workspace and improved aesthetics. The '385 patent teaches a flip up monitor, but it has no sliding keyboard tray, and the flip up monitor is not height adjustable, nor does it create a watertight seal with the desk surface when in the down position. The monitor in the '385 invention is also attached to the desk shelf and not to the desktop, as in the present invention.

None of the above inventions and patents, taken either singly or in combination, is seen to describe the instant invention as claimed.

SUMMARY OF THE INVENTION

In many workplaces across the country space is at a premium. The present invention combats this problem by allowing a desktop workspace to be converted from a traditional flat desktop work surface to a computer workstation. The invention is an ideal design for retrofitting into existing work surfaces. It has a bracket that is mounted into a slot cut into the existing desktop work surface. A flat panel monitor and a keyboard tray are slidably mounted to the bracket. The monitor has open and closed positions and may be adjusted for height, distance from the viewer, and viewing angle. When in the closed position the monitor forms a watertight seal with the existing desktop work surface, and forms a portion of the desktop work surface.

Accordingly, it is a principal object of the invention to provide a flip down monitor with retractable keyboard tray which is mountable to a desktop in order to allow the desktop work surface to function as a computer work station and as a traditional flat desktop work surface.

It is a further object of the invention to provide a monitor and keyboard tray system that is easy to install and or retrofit into an existing work surface.

Still another object of the invention is to provide a flip down monitor that forms a watertight seal with an existing desktop work surface.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
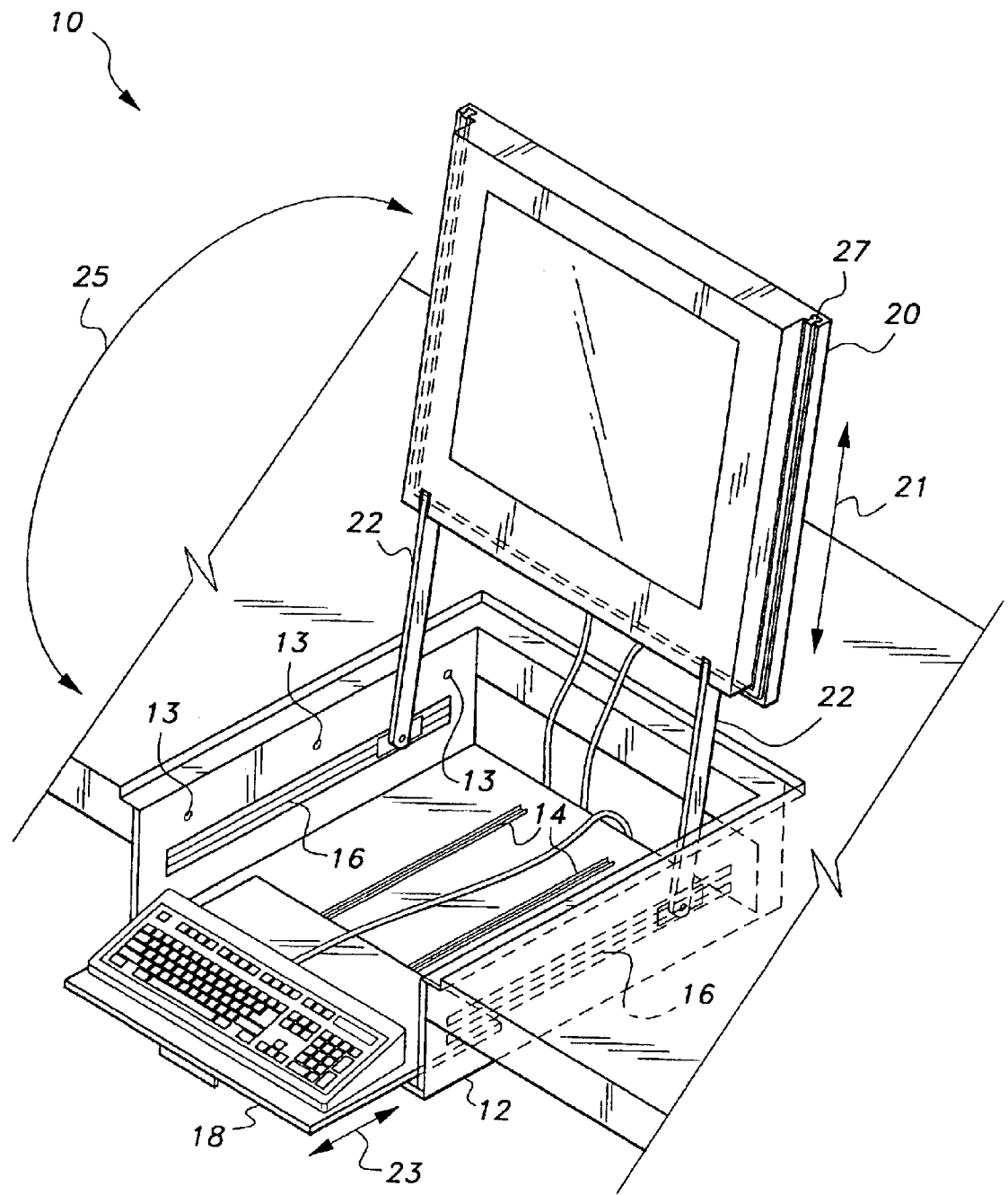
FIG. 1 is an environmental, perspective view of a flip down monitor with retractable keyboard tray according to the present invention with the monitor in the open position.

FIG. 1 shows the present invention 10 attached to a desktop work surface. The invention has a U-shaped bracket 12 defined by a horizontal bottom wall and opposing sidewalls. Several screw mounting holes 13 are defined in each sidewall of the bracket 12. The bracket 12 is secured to an existing desktop work surface with a plurality of screws, which travel through each hole 13 and into the work surface. The U-shaped bracket may be retrofit to any existing desktop work surface. Two keyboard guide rails 14 or tracks are attached to the bottom wall of the bracket 12 and one monitor guide rail 16 or track is attached to each sidewall of the bracket 12. A keyboard tray 18 is slidably attached to the keyboard rails 14. An adjustable flat panel monitor 20 is slidably connected to the monitor rails 16 by two support rods 22. The height of the monitor 20 above the desktop may be adjusted up and down as shown in arrow 21. The position of the monitor 20 may also be adjusted forward or backward as shown by bi-directional arrow 23, or it may be pivoted as shown by arrow 25.

Figure 2:
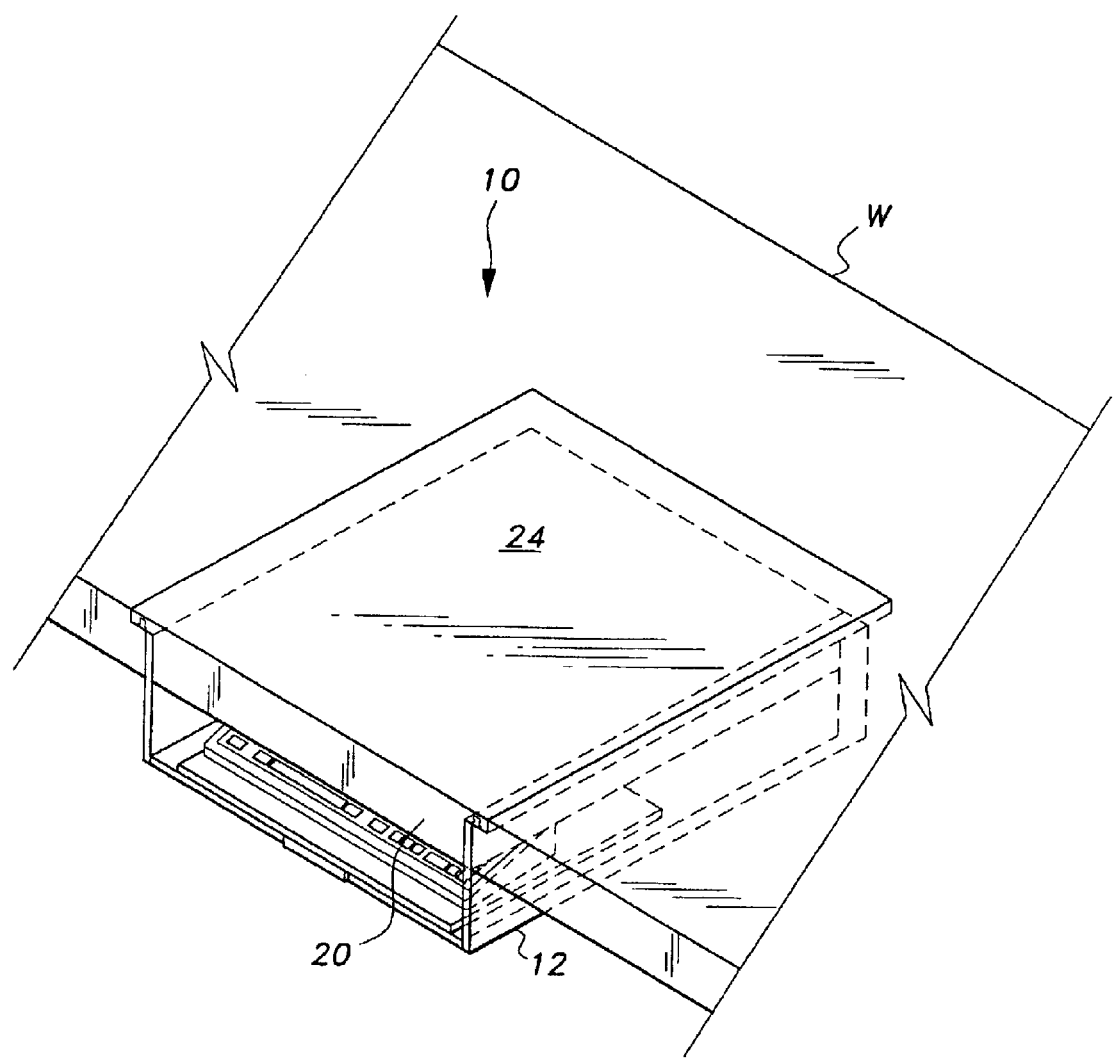
FIG. 2 is an environmental, perspective view of a flip down monitor with retractable keyboard tray according to the present invention with the monitor in the closed position.

The unique design of the invention allows the monitor 20 to alternate between an open position, as shown in FIG. 1, and a closed position, as shown in FIG. 2. When in the closed position the back of the monitor is preferably flush with the rest of the existing desktop work surface W. The monitor 20 has a flat back plate 24 that can be colored to match the existing desktop work surface W. The back plate 24 is preferably made of a durable material, such as plastic.

Figure 3:
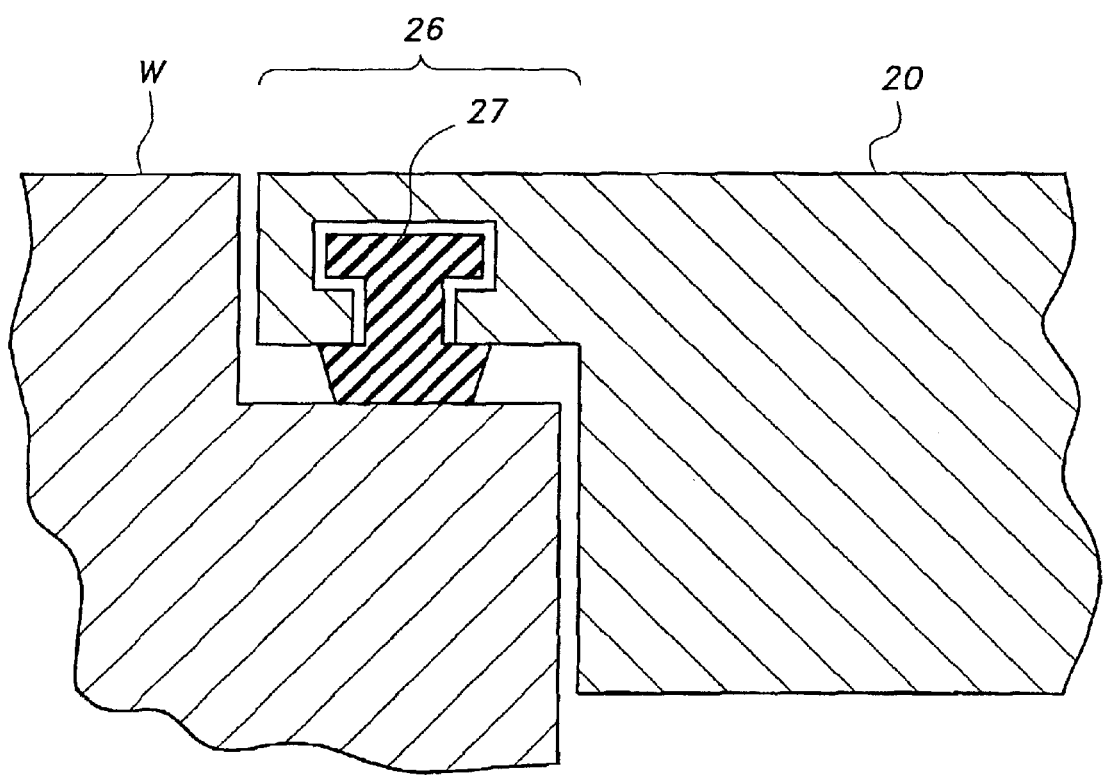
FIG. 3 is a sectional view of the interface between the monitor and the desktop work surface.

When the monitor 20 is in the closed position it forms a watertight seal with the existing work surface W. The seal is created by a rubber gasket 27 attached to a lip 26 on the monitor 20 which comes into contact with the desktop work surface W as shown in FIG. 3. The gasket 27 runs along the lip 26 on the left, right, and rear sides of the monitor 20.

Figure 4:
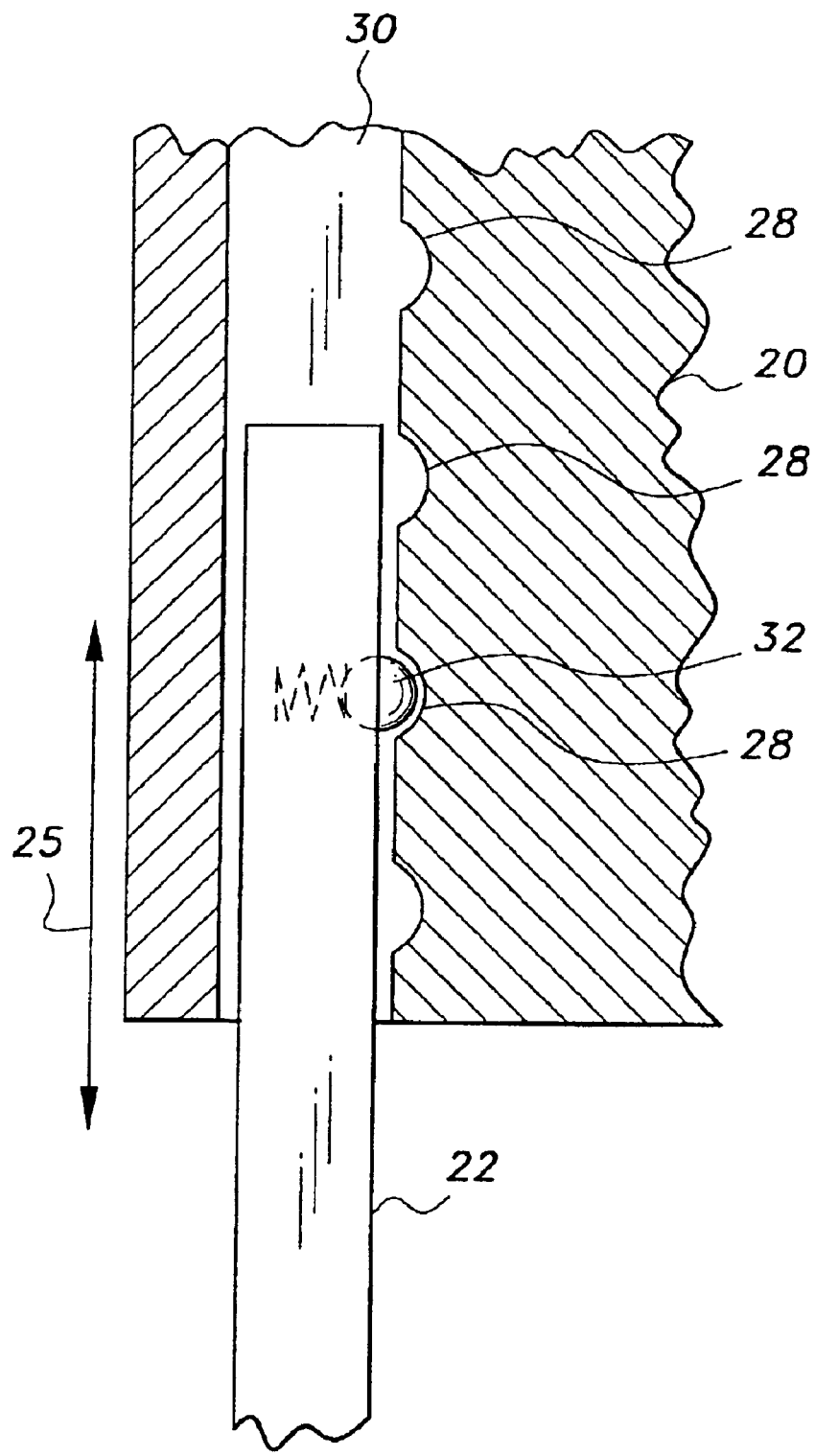
FIG. 4 is a sectional view of the support rod monitor adjustment mechanism.

FIG. 4 details a detent mechanism that allows the monitor 20 to be adjusted along the support rods 22. Each support rod 22 telescopes into a shaft 30 defined along the left and right sides of the monitor 20. Each shaft 30 has a plurality of semicircular depressions 28 defined therein. The monitor 20 is held in position on the shaft by a spring-loaded ball bearing catch 32, which interacts with the semicircular depressions 28.

Figure 5:
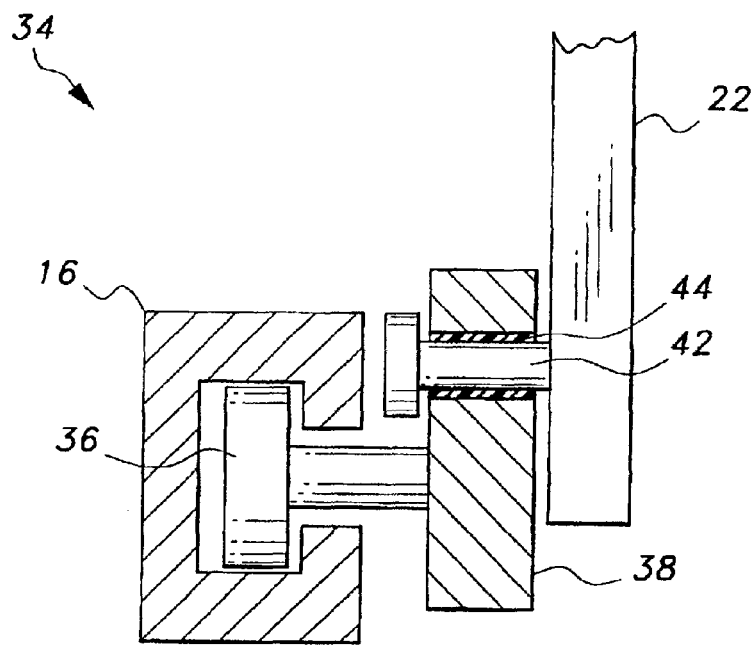
FIG. 5 is a front sectional view of an adjustment slider.
Figure 6:
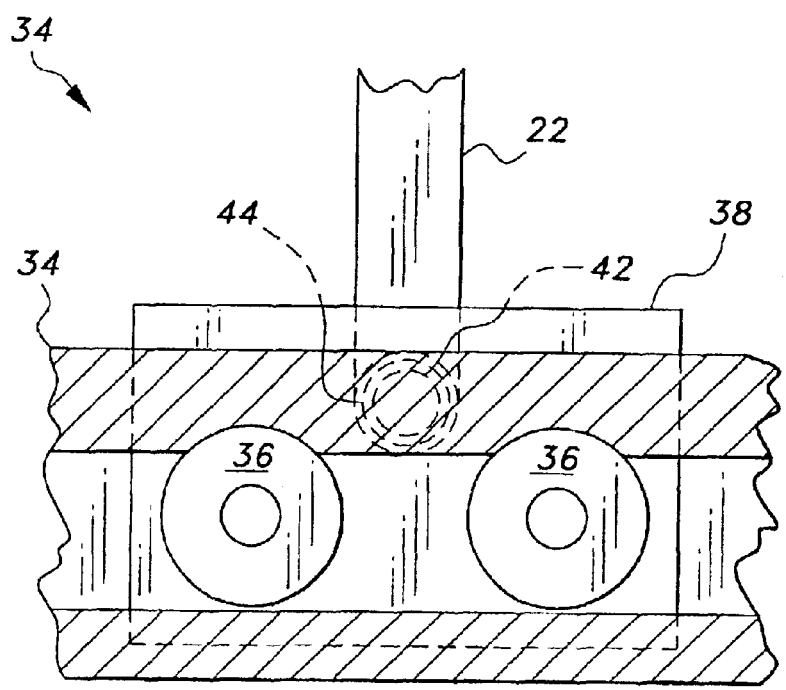
FIG. 6 is a side sectional view of an adjustment slider.

FIGS. 5 and 6 details one of the adjustment assemblies 34 that connect the support rods 22 to the monitor rails 16. Each adjustment assembly 34 has two wheels 36 that ride inside a monitor rail 16. The wheels 36 are mounted on axles extending from a rectangular plate 38. A connection arm 42 disposed upon each support rod 22 extends through a hole defined in the plate 38. A bushing 44 is positioned inside the hole defined in the plate 38 and permits rotation of the support rod while exerting sufficient friction against the arm 42 to support the monitor 20 at any desired angle of rotation relative to the desktop. This allows the user of the desktop to maintain the monitor 20 in a position that provides ergonomic support and comfort to the user.

It is to be understood that the present invention is not limited to the sole embodiment described above, but encompasses any and all embodiments within the scope of the following claims.

I claim:

1. An integrated flip down monitor and sliding keyboard tray, comprising
    a U-shaped bracket having a horizontal bottom wall and a pair of opposing sidewalls, the bracket being adapted for attachment to a desktop work surface;
    a keyboard tray adapted for receiving a keyboard, the tray being slidably disposed on the bottom wall of said U-shaped bracket;
    two support rods slidably and pivotally disposed on the opposing sidewalls of said U-shaped bracket;
    a flat panel monitor having a lip defined about the perimeter of said monitor, said monitor being attached to said support rods;
    a detent mechanism for adjusting said monitor along said support rods;
    wherein said monitor pivots between an open position above said bracket and a closed position parallel with the bottom wall of said bracket in order to form a portion of the desktop work surface;
    wherein each of said support rods extends into a shaft located on each side of said monitor where each shaft further comprises a plurality of semicircular depressions defined therein, wherein said monitor is held into position on said shaft by a catch that interacts with said semicircular depressions.

2. The integrated flip down monitor and sliding keyboard tray according to claim 1, wherein at least one keyboard guide rail is attached to said horizontal bottom wall of said U-shaped bracket for slidably disposing said keyboard tray onto said bottom wall.

3. The integrated flip down monitor and keyboard tray according to claim 1, wherein said monitor in said closed position forms a watertight seal with said desktop work surface, wherein said seal is created by a rubber gasket, attached to said monitor, which comes into contact with said desktop work surface.

4. The integrated flip down monitor and keyboard tray according to claim 1, wherein said integrated flip down monitor and keyboard tray is adapted to fit into any existing desktop workstation.

5. The integrated flip down monitor and sliding keyboard tray according to claim 1, further comprising a plurality of mounting holes disposed in said opposing sidewalls.

6. The integrated flip down monitor and sliding keyboard tray according to claim 5, further comprising a plurality of screws that extend through said mounting holes to secure said U-shaped bracket to said desktop work surface.

7. The integrated flip down monitor and sliding keyboard tray according to claim 1, wherein a monitor guide rail is attached to each of said opposing sidewalls for slidably and pivotally disposing said support rods on said opposing sidewalls of said U-shaped bracket.

8. The integrated flip down monitor and keyboard tray according to claim 7, further comprising an adjustable assembly for slidably connecting said support rods to said monitor rails wherein said adjustment assembly comprises a plurality of wheels that ride inside of said monitor rail where said wheels are mounted on axles extending from a rectangular plate.

9. The integrated flip down monitor and keyboard tray according to claim 1, wherein said monitor has a flat back plate that, when in said closed position, becomes flush with said desktop work surface, wherein said flat back plate is colored to match said desktop work surface.

10. The integrated flip down monitor and keyboard tray according to claim 9, wherein said back plate is preferably made of a durable plastic.

11. An integrated flip down monitor and sliding keyboard tray, comprising:
    a U-shaped bracket having a horizontal bottom wall and a pair of opposing sidewalls, the bracket being adapted for attachment to a desktop work surface;
    a keyboard tray adapted for receiving a keyboard, the tray being slidably disposed on the bottom wall of said U-shaped bracket;
    two support rods slidably and pivotally disposed on the opposing sidewalls of said U-shaped bracket;
    a flat panel monitor having a lip defined about the perimeter of said monitor, said monitor being attached to said support rods;
    an adjustable assembly for slidably connecting said support rods to said monitor rails;
    wherein said monitor pivots between an open position above said bracket and a closed position parallel with the bottom wall of said bracket in order to form a portion of the desktop work surface;
    wherein a monitor guide rail is attached to each of said opposing sidewalls for slidably and pivotally disposing said support rods on said opposing sidewalls of said U-shaped bracket;

wherein said adjustment assembly comprises a plurality of wheels that ride inside of said monitor rail where said wheels are mounted on axles extending from a rectangular plate and a connection arm disposed upon each of said supporting rods that extend through a hole in said rectangular plate wherein a bushing in said hole permits rotation of said support rods while exerting sufficient friction against said connection arm to pivot and support said monitor at any angle of rotation relative to said desktop work surface to allow the user to maintain the monitor in an ergonomically comfortable position.

12. An integrated flip down monitor and sliding keyboard tray in combination with a desktop work surface, comprising:

a desktop work surface having a U-shaped recess defined therein;

a U-shaped bracket having a horizontal bottom wall and a pair of opposing sidewalls, the sidewalls of said bracket being attached to the U-shaped recess defined in said desktop work surface;

a keyboard tray adapted for receiving a computer keyboard, the tray being slidably disposed on the bottom wall of said U-shaped bracket;

two support rods slidably and pivotally disposed on the opposing sidewalls of said U-shaped bracket;

a flat panel monitor having a lip defined about the perimeter of said monitor and having a back surface, said monitor being attached to said support rods;

a detent mechanism for adjusting said monitor along said support rods;

wherein said monitor pivots between an open position above said desktop work surface and a closed position parallel with the bottom wall of said bracket, the back surface of said monitor being planar with said desktop work surface in order to fill the recess defined in said desktop work surface;

wherein each of said support rods extends into a shaft located on each side of said monitor where each shaft further comprises a plurality of semicircular depressions defined therein, wherein said monitor is held into position on said shaft by a catch that interacts with said semicircular depressions.

13. The integrated flip down monitor and sliding keyboard tray according to claim 12, wherein at least one keyboard guide rail is attached to said horizontal bottom wall of said U-shaped bracket for slidably disposing said keyboard tray onto said bottom wall.

14. The integrated flip down monitor and sliding keyboard tray according to claim 12, wherein a monitor guide rail is attached to each of said opposing sidewalls for slidably and pivotally disposing said support rods on said opposing sidewalls of said U-shaped bracket.

15. The integrated flip down monitor and keyboard tray according to claim 12, wherein said monitor has a flat back plate that, when in said closed position, becomes flush with said desktop work surface, wherein said flat back plate is colored to match said desktop work surface.

16. The integrated flip down monitor and keyboard tray according to claim 12, wherein said monitor in said closed position forms a watertight seal with said desktop work surface, wherein said seal is created by a rubber gasket, attached to said monitor, which comes into contact with said desktop work surface.

17. The integrated flip down monitor and sliding keyboard tray according to claim 12, further comprising a plurality of mounting holes disposed in said opposing sidewalls.

18. The integrated flip down monitor and sliding keyboard tray according to claim 17, further comprising a plurality of screws that extend through said mounting holes to secure said U-shaped bracket to said desktop work surface.

* * * * *